May 15, 1962 J. NOBLE ET AL 3,034,554
SELF-LOCKING TIRE PROTECTIVE ATTIRE
Filed Sept. 12, 1960 2 Sheets-Sheet 2

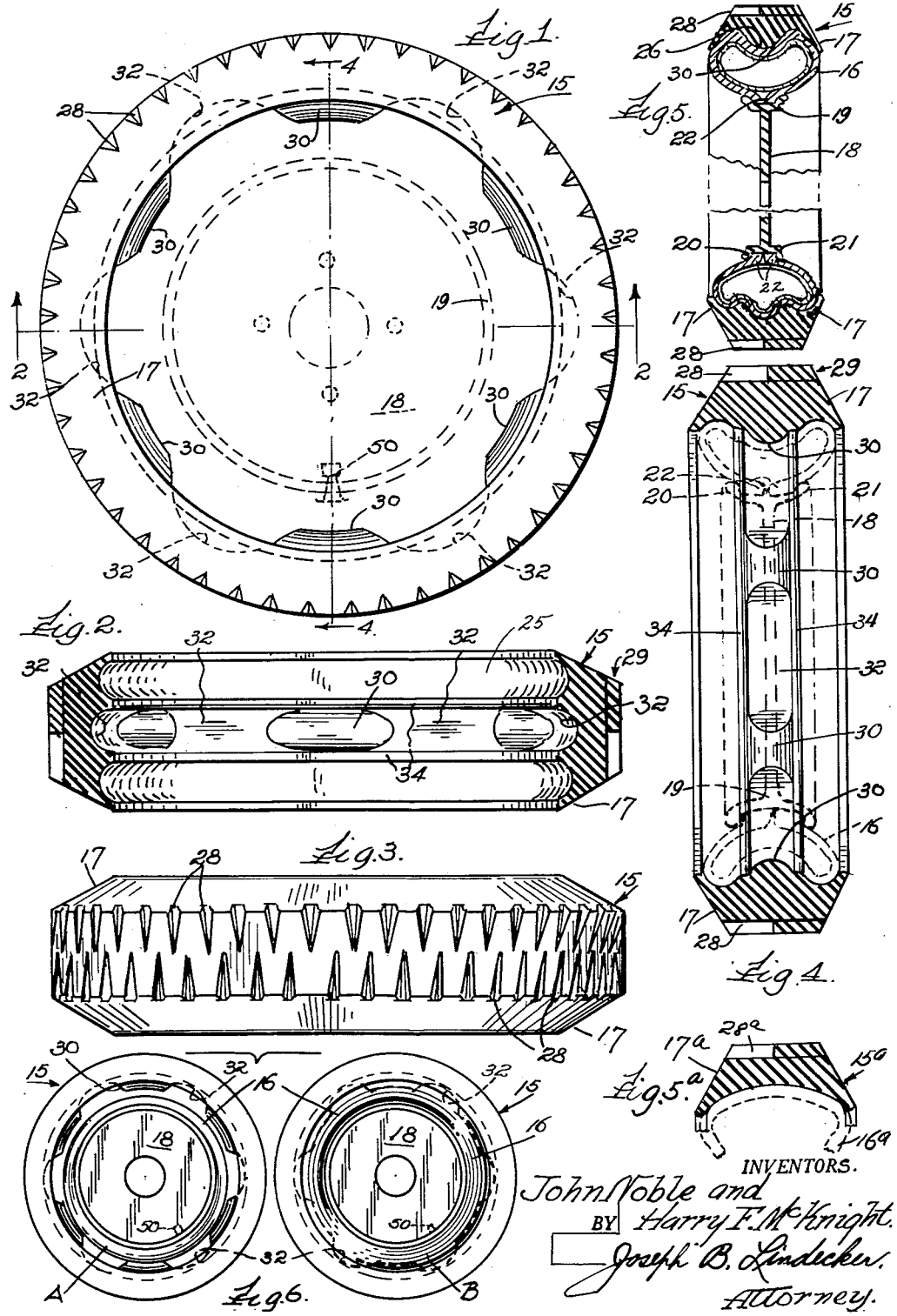

INVENTORS.
John Noble and
BY Harry F. McKnight
Joseph B. Lindecker
Attorney

United States Patent Office 3,034,554
Patented May 15, 1962

3,034,554
SELF-LOCKING TIRE PROTECTIVE ATTIRE
John Noble, 3321 W. Pierce Ave., Chicago 51, Ill., and Harry F. McKnight, Box 182, Crest and Park Ave., Bensenville, Ill.
Filed Sept. 12, 1960, Ser. No. 55,477
3 Claims. (Cl. 152—187)

This invention relates to improvements in a vehicle tire protective attire adapted for use in connection with pneumatic tires having worn treads.

An important object of this invention is to provide a tire tread formed in one circular section whereby the same may be readily engaged with and removed from the used tire arranged on the wheel and which is adapted to firmly grip the outer portion of the tire when the latter is inflated and is thus held against slipping thereon and which will effectually protect the used tire against puncture.

Another object is to provide a traction assembly for the substantially used tire of the wheel of a vehicle having an annulus so shaped and arranged that at times when the tire is sufficiently inflated said assembly is thereby locked to said used tire without the use of extraneous means.

A further object is to provide a rubber or like material type unit so form to be applied to pneumatic tires as a protective covering, or non-slip tread without the necessity of discarding the original used pneumatic tire if still usable.

A still further object is to provide a one piece fabric and rubber unit to be used with a pneumatic tire which is adaptable for ready application and removability without removing the pneumatic tire from the rim.

In carrying our invention into practice, we provide a single unitary attire or covering for a pneumatic tire forming an auxiliary annulus tread with integral side walls, a structure being substantially U-shaped in transverse cross-section, being curved transversely to closely fit the curvature of the tread or outer surface of the pneumatic tire with which the same is engaged. The convex top side of the attire being formed with the usual corrugated tread of small grooves, while the concave inside surface being formed with circumferentially spaced protrusions thereon with depressions arranged therebetween providing a receiving surface with corrugations, or elevations and depressions, being in appearance as undulations in circumferential cross-section, the elevations thereof embedding themselves into the outer surface of the pneumatic tire and the depressions receiving the bulging portions of the pneumatic tire caused by said elevations, thereby effecting a securing means between the attire and the pneumatic tire without the use of extraneous means. The attire is applied and secured in position on the tire in the manner described before the tire on the wheel is completely inflated so that when the tire is totally inflated with the attire in place the tire will be expanded into firm engagement with the inner surface of the attire and the depressions and elevations thereof.

Other and further objects of the invention will be understood from the following detailed description thereof, reference being had to the accompanying drawing in which:

FIGURE 1 is a side elevation of the new device assembled upon a pneumatic tire shown by dotted lines;

FIGURE 2 is a transverse section of the device shown by FIG. 1, the view being taken horizontally and substantially on line 2—2 of FIG. 1 and looking in the direction of the arrows;

FIGURE 3 is a plan view of the device, or tire attire, shown by FIGURES 1 and 2;

FIGURE 4 is a transverse section of the attire, the view taken vertically and substantially on line 4—4 of FIG. 1;

FIGURE 5 is a fragmentary transverse sectional view of the attire mounted upon a tire assembled upon a vehicle rim;

Figure 7:
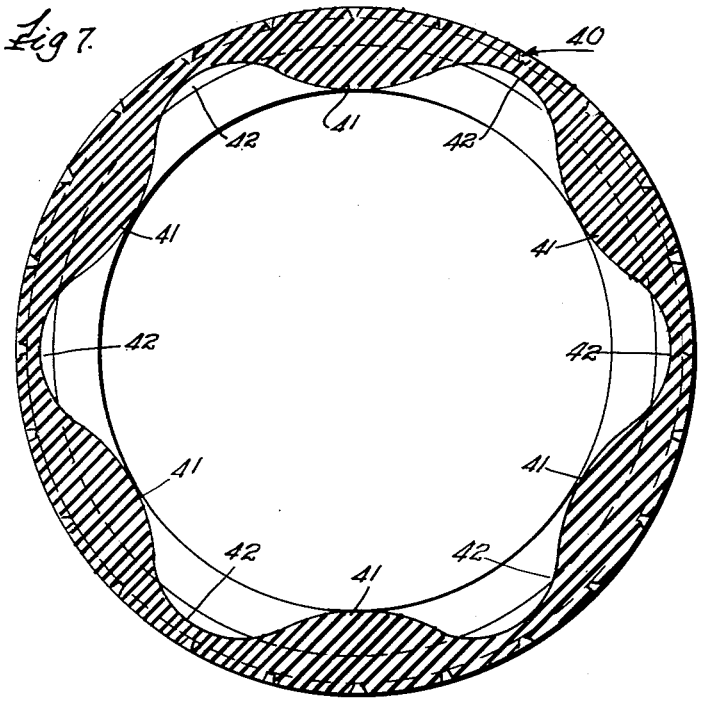
Figure 9:
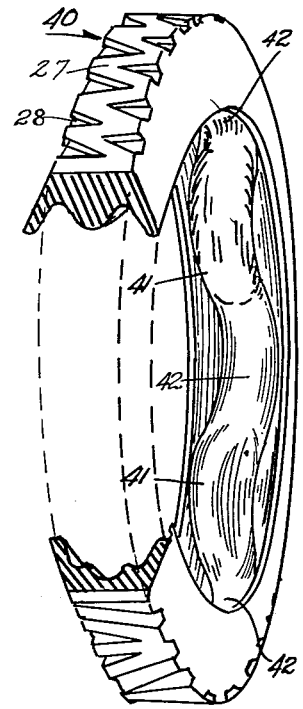
Figure 8:
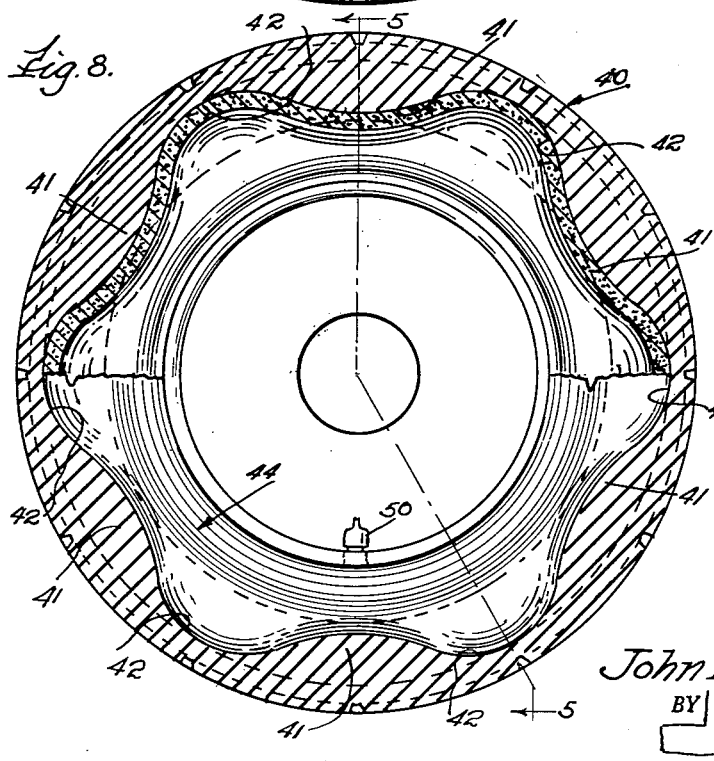
Figure 10:
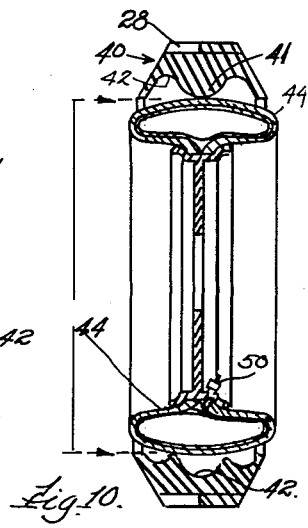

FIGURE 5-a is a fragmentary transverse sectional view of a modified form of attire and mounted upon a tire shown by dotted lines;

FIGURE 6 is a composite operation view, the tire "A" is shown deflated in one part, and the tire "B" is shown inflated to desired running pressure;

FIGURE 7 is a circumferntial sectional view of an attire, a modified form similar to FIG. 1, having the undulations of continuous radial configuration;

FIGURE 8 is a circumferential sectional view of an attire assembled upon an inflated pneumatic tire mounted upon a vehicle wheel;

FIGURE 9 is a perspective view of the attire shown by FIG. 7, with a fragmentary portion shown in section; and FIGURE 10 is a transverse sectional view of an attire arranged upon a pneumatic tire mounted on a vehicle wheel, the pneumatic tire being shown prior to complete inflation thereof.

Referring now to the drawing for a more particular description, my improved attire 15 is formed of one annulus type section, said section being curved transversely to closely fit the pneumatic tire 16 with which it is engaged and of sufficient width to extend across the tread of the tire 16, the side walls 17 of the attire gripping adjacent portions of the tire side walls, as shown by FIG. 5 of the drawing.

The particular disc wheel shown by FIG. 5 in the drawing includes a central circular disc portion 18 with an annulus type steel rim with a rim 19 having outwardly flared felloe portions respectively, indicated at 20 and 21, whereby a trough therebetween is provided for receiving the beads 22 of the tire 16, the tire being easily mounted or removed from the rim 19 prior to inflation thereof.

It will be understood that the herein described invention may be assembled and operated upon a pneumatic tire at times when the latter is mounted upon the conventional type vehicle wheel.

The new device, or attire 15 for a tire 16, includes a comparatively wide annulus, substantially U-shape in transverse cross-section and which is formed of a single unitary section.

As best shown by FIGURES 5 and 9, the annulus is of concavo-convex contour in transverse cross-section, the inner concave surface 25 thereof receiving the outer surface of the tread portion 26 of the tire 16 snugly, the tread portion 29 of the attire formed with a plurality of corrugations, or small grooves therein, forming the cleats 27, or zig-zag tread clearly shown by FIGURE 9, and/or grooves 28 shown by FIGURE 3. The concave inside surface is formed with a single row of circumferentially spaced protrusions 30 in circumferential alignment having elliptical surface portions as shown by FIGURES 1, 2 and 4. The inside surface is also formed with depressions 32 arranged circumferentially in circumferential alignment between said protrusions 30, being in appearance as undulations in circumferential cross-section, see FIG. 9, at times when the pneumatic tire 16 is inflated, the tire becoming locked to said annulus, the protrusions 30 engaging with the substantially worn smooth surface of the tire 16 free of any special conforming grooves, and the adacent tire wall bulging and becoming arranged in the depressions 32 with both its exterior and interior peripheral surfaces curving to form the same, whereby movements of the attire 15 with respect to the annulus is prevented and traction assured with the use of the attire 15 on tire 16. The undulations form circumferential raised portions 34 which, when in engagement with the tire 16, assist in preventing transverse movement of the attire 15 or the tire 16, clearly shown by FIGS. 3 and 4.

As shown by FIG. 5, the undulations are in tight engagement with the external surface 26 of the tire 16 without becoming embedded in the tread because the tire wall itself curves to fit the undulations. FIGURE 6 shows a deflated tire "A" with an attire 15 arranged loosely upon a tire 16 assembled on a wheel 18; the inflated tire "B" shown with the attire 15 tightly secured thereon. The protrusions 30 are clearly shown by FIG. 4. The modified form of attire 15–A is shown by FIG. 5–a assembled on tire 16–A with its walls 17–A gripping the pneumatic tire 16–A.

FIGURES 7 and 9 clearly show a modified type of attire 40 with protrusions 41 and depressions 42, the undulations forming radial, continuous corrugations. FIGURES 8 and 10 show the modified type attire 40 arranged upon a pneumatic tire 44; FIG. 8 shows the tire 44 inflated with its exterior tread surface engaging the protrusions 41 and depressions 42 causing the peripheral surfaces of both the internal and external surfaces of the tire wall to become curved. FIGURE 10 showing the attire 40 loosely arranged upon the tire 44 before it is inflated for traveling conditions.

During operation the unitary annulus type section attire may be placed upon the upper portion of the tread of the tire after the wheel is jacked upwardly from the ground, the pneumatic tire being assembled upon the wheel; if inflated a small amount of air is permitted to escape through the conventional valve stem 50 of the tire 16 for slightly deflating said tire whereupon the protrusion 30 engage the tread of the tire 16, after which the tire 16 is then inflated for locking the annulus to the tread thereof by causing the peripheral tire wall to bulge causing the interior and exterior wall surfaces thereof to cause uniform curves thereof.

From the foregoing description it is thought to be obvious that a traction device, or attire, for a worn pneumatic tire of a vehicle or the like, the attire constructed in accordance with our invention is particularly well adapted for use by reason of the convenience and facility with which it may be applied to a tire and operated, and it will also be obvious that our invention is susceptible of some change and modification without departing from the principles and spirit thereof, and for this reason we do not wish it to be understood as limiting ourselves to the precise arrangement and formation of the undulations herein shown in carrying out our invention in practice except as claimed.

We claim as our invention:

1. A supplemental, externally applicable, self-locking cover for normally inflated pneumatic automobile tires having smooth worn treads free of special grooves comprising, a single section resilient annulus having a concave inner surface and a convex outer surface, a single row of circumferentially spaced, radially extending, protrusions in circumferential alignment carried by the concave inner surface of said annulus, said protrusions having elliptical external surface portions adapted to engage the outer normal worn surface of a pneumatic tire and effecting the curving of the peripheral wall of the tire thereby forming bulges and hollow portions in both the interior and external wall surfaces of said tire.

2. A supplemental, externally applicable, self-locking cover for normally inflated pneumatic automobile tires having smooth worn treads free of special grooves comprising, a single resilient annulus having a concave inner surface and a convex outer surface, a single row of circumferentially spaced, radially extending, protrusions in circumferential alignment carried by the concave inner surface of said annulus, undulations formed by said protrusions having elliptical exterior surface portions and eliptical shaped depressions formed in said concave inner surface of said annulus between said protrusions, said undulations being adapted to engage the worn surface of the pneumatic tire and effecting the curving of the entire peripheral wall of the tire forming uniform bulges and hollow portions in both the interior and exterior wall surfaces of the said peripheral wall of the tire.

3. A supplemental, externally applicable, self-locking cover according to claim 2 wherein said protrusions and depressions forming said undulations being radially continuous corrugations having substantially the same curvature.

References Cited in the file of this patent

UNITED STATES PATENTS

| | | |
|---|---|---|
| 1,276,875 | Colby | Aug. 27, 1918 |
| 1,362,979 | Wolfe | Dec. 21, 1920 |
| 1,391,412 | Roth | Sept. 20, 1921 |
| 2,735,471 | McLean | Feb. 21, 1956 |

FOREIGN PATENTS

| | | |
|---|---|---|
| 306,806 | Great Britain | 1930 |
| 410,883 | Italy | June 14, 1945 |